United States Patent
Giordan et al.

(10) Patent No.: US 10,871,402 B2
(45) Date of Patent: Dec. 22, 2020

(54) DEVICE FOR MEASURING THE CHARACTERISTICS OF AN AIR FLOW

(71) Applicant: Safran Aircraft Engines, Paris (FR)

(72) Inventors: Jérémy Giordan, Moissy-Cramayel (FR); Florian Joseph Bernard Kockenpo, Moissy-Cramayel (FR); Thibault Xavier Alexis Berranger, Maincy (FR); Pascal Léon Georges Beilvert, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 222 days.

(21) Appl. No.: 15/939,449

(22) Filed: Mar. 29, 2018

(65) Prior Publication Data

US 2018/0283960 A1 Oct. 4, 2018

(30) Foreign Application Priority Data

Mar. 31, 2017 (FR) ...................................... 17 52781
Mar. 31, 2017 (FR) ...................................... 17 52800

(51) Int. Cl.
*G01K 1/00* (2006.01)
*G01K 13/00* (2006.01)
(Continued)

(52) U.S. Cl.
CPC .............. *G01K 1/14* (2013.01); *F01D 17/08* (2013.01); *F01D 17/085* (2013.01); *G01F 1/34* (2013.01);
(Continued)

(58) Field of Classification Search
USPC ........ 374/208, 138, 141, 148, 166, 163, 143
See application file for complete search history.

(56) References Cited

U.S. PATENT DOCUMENTS 2,820,839 A * 1/1958 Schunke ................ G01K 13/02
136/231
4,572,677 A 2/1986 Sehgal
(Continued)

FOREIGN PATENT DOCUMENTS

EP 2 492 441 A2 8/2012
FR 3 051 044 A1 11/2017

OTHER PUBLICATIONS

H. I.H. Saravanamuttoo: "Recommended Practices for Measurement of Gas Path Pressures and Temperatures for Performance Assessment of Aircraft Turbine Engines and Components", AGARD Advisory Report No. 245, Sep. 11, 1990, pp. 42-45.

*Primary Examiner* — Mirellys Jagan
(74) *Attorney, Agent, or Firm* — Blank Rome LLP (57) ABSTRACT

A device for measuring the characteristics of an air flow intended to be mounted in an annular duct having a longitudinal axis in a turbine engine, comprising supporting means which support means for measuring the characteristics of an air flow. According to the invention, the supporting means comprise at least one first support including a main branch supporting first measuring means and a second support, structurally independent of the first support and including a main branch supporting second measuring means, with the first support and the second support being so formed that the main branch of the first support extends over a distance greater than the main branch of the second support in a common direction of extension of the branches.

17 Claims, 4 Drawing Sheets

(51) Int. Cl.
    *G01K 7/00*     (2006.01)
    *G01K 1/14*     (2006.01)
    *G01M 15/14*     (2006.01)
    *G01K 13/02*     (2006.01)
    *F01D 17/08*     (2006.01)
    *G01F 1/34*     (2006.01)
    *G01K 1/02*     (2006.01)
    *G01P 5/165*     (2006.01)
    *G01F 1/684*     (2006.01)
    *G01P 5/14*     (2006.01)
    *F01D 25/24*     (2006.01)
    *F01D 9/06*     (2006.01)

(52) U.S. Cl.
    CPC .............. *G01K 1/026* (2013.01); *G01K 13/02* (2013.01); *G01M 15/14* (2013.01); *G01P 5/165* (2013.01); *F01D 9/065* (2013.01); *F01D 25/243* (2013.01); *F01D 25/246* (2013.01); *G01F 1/684* (2013.01); *G01K 2013/024* (2013.01); *G01P 5/14* (2013.01)

(56) References Cited

U.S. PATENT DOCUMENTS

| | | | | |
|---|---|---|---|---|
| 5,812,588 | A * | 9/1998 | Deak | G01K 1/12 136/230 |
| 6,776,524 | B2 * | 8/2004 | Park | G01K 7/02 374/148 |
| 8,944,678 | B2 * | 2/2015 | Snider | G01K 1/12 374/116 |
| 2004/0114665 | A1 | 6/2004 | Park et al. | |
| 2010/0158074 | A1 * | 6/2010 | Fortier | G01K 1/026 374/208 |

* cited by examiner

DEVICE FOR MEASURING THE CHARACTERISTICS OF AN AIR FLOW

BACKGROUND OF THE INVENTION

1. Field of the Invention

The present invention relates to a device for measuring the characteristics of an air flow, specifically in a turbine engine, such as a turbojet engine or a turboprop engine.

2. Description of the Related Art

Figure 1:
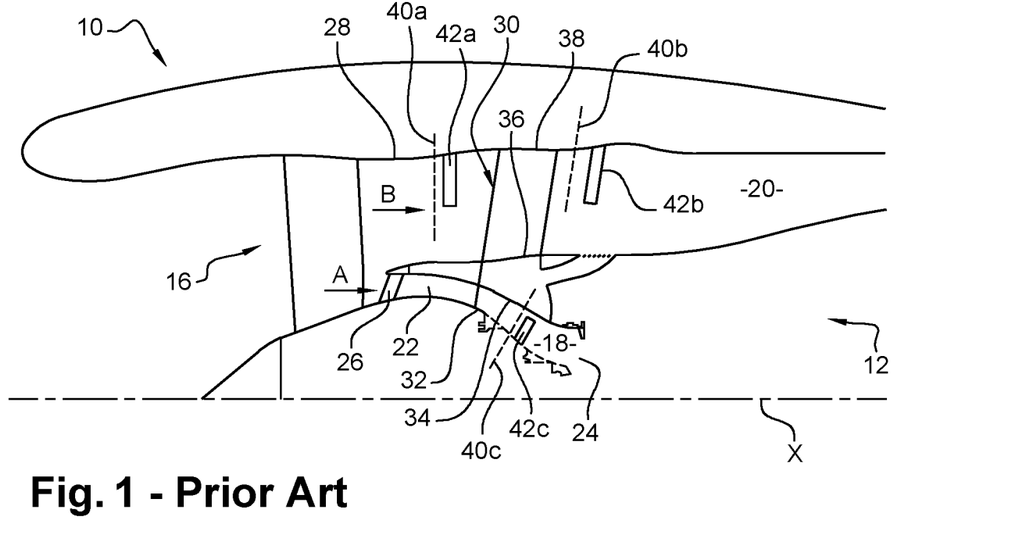
FIG. 1 already described is a cross-sectional axial diagrammatic half-view of an aircraft turbofan of a known type.

Conventionally, a dual-flow turbofan 10, as illustrated in FIG. 1, consists of a gas turbine 12 with a revolution axis 14 driving a ducted fan wheel 16, wherein the latter is generally positioned upstream from the turbofan. The mass of air sucked in by the engine is divided into a primary air flow (arrow A) that flows through the gas turbine 12 or engine core and a secondary air flow (arrow B) originating from the fan 16 and surrounding the engine core, wherein the primary and secondary air flows are concentric and circulate in a primary annular flow passage 18 and a secondary annular flow passage 20, respectively.

In a manner well known per se, the primary air flow (arrow A) is generally compressed by a low-pressure compressor 22 and subsequently by a high-pressure compressor 24, each having vanes both fixed 26 and mobile arranged alternatively in the direction of movement of the flow. The low-pressure compressor shaft is connected to the fan wheel 16 and is driven in rotation by the shaft of a low-pressure turbine arranged downstream (not illustrated). The low-pressure compressor shaft is driven in rotation by the shaft of a high-pressure turbine arranged at the outlet of a combustion chamber and located upstream from the low-pressure turbine (both not illustrated).

In a double-body turbofan of this kind, fan casing usually designates the external annular wall 28 surrounding the fan wheel 16 and intermediate casing 30 designates a structural element of the turbine engine interposed axially between the compressors, low-pressure 22 and high-pressure 24, which passes through the annular flow passages, primary 18 and secondary 20. This intermediate casing 30 comprises two annular walls, radially internal 32 and external 34, respectively delimiting, internally and externally, the primary annular air flow passage 18 and two annular walls, radially internal 36 and external 38 delimiting internally and externally the secondary annular flow passage 20, respectively.

Within the context of developing a turbofan, the latter's performances need to be tested with a view to its certification. Development turbine engines are therefore provided for this purpose. A large number of measurements are performed on these turbofans. The characteristics of the aerodynamic flow in particular are measured at a plurality of specific axial positions or measurement planes, such as those bearing reference numbers 40a, 40b, 40c.

For this purpose, measuring elements 42a, 42b, 42c, commonly known as measurement sensors, arranged on the measurement planes 40a, 40b, 40c, are generally used to characterise the aerodynamic flow by measuring parameters such as pressure and temperature for example during operation.

Figure 2:
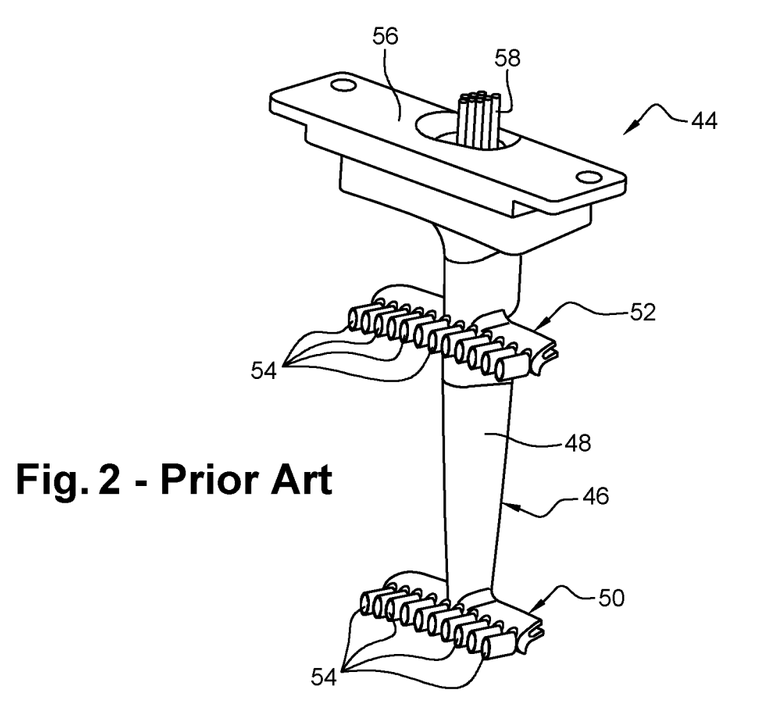
FIG. 2 already described is a perspective schematic view of a device for measuring characteristics of a flow according to the known technology.

As shown in FIG. 2, such a measuring device comprises a support 46 including a main branch 48 which extends in a substantially radial direction in the secondary air flow and a first 50 and second 52 auxiliary branches which extend in a substantially circumferential direction. Each auxiliary branch 50, 52 comprises nozzles 54 which accommodate means for measuring the characteristics of the air flow.

The support 46 comprises a baseplate 56 formed at the radially external end of the main branch 48, with such base plate 56 being intended to be mounted from outside the secondary air annular flow passage in one opening of the radially external annular wall 48 and rigidly screwed thereon. The means for measuring the characteristics of the air flow are connected to processing and analysing means through electric wires 58 which circulate in the main branch 46 through the baseplate 56.

The first auxiliary branch 50 is arranged radially inside the second auxiliary branch 52 and is positioned at the free end of the main branch 48, i.e. at the radially internal end thereof. The auxiliary branches 50, 52 substantially extend in an arc of circle, the centre of which is positioned on the axis of rotation X of the turbine engine.

Such a device makes it possible to measure the characteristics of the air flow at two radially different positions and several positions on the circumference of each said radial position.

Such type of device has large dimensions which affect the flow of air, which results in a modification in the very characteristics of the air flow to be measured.

SUMMARY OF THE INVENTION

An object of the invention is to provide a solution to the above-mentioned problems that is simple, effective, and inexpensive.

For this purpose, the invention provides for a device for measuring the characteristics of an air flow intended to be mounted in an annular duct having a longitudinal axis in a turbine engine, comprising supporting means which support means for measuring the characteristics of an air flow, characterized in that the supporting means comprise at least one first support including a main branch supporting first measuring means and a second support, structurally independent of the first support and including a main branch supporting seconds measuring means, with the first support and the second support being so formed that the main branch of the first support extends over a distance greater than the main branch of the second support in a common direction of extension of said branches.

According to the invention, the device comprises two structurally independent supports, with each one supporting measuring means. Such device makes the mounting and assembling the device easy from one opening in the radially external annular wall of an annular duct, such as an annular wall outwardly delimiting the annular flow passage of a secondary air flow in a turbine engine.

According to another characteristic of the invention, the main branch of the first support supports at least one auxiliary branch provided with first measuring means and the main branch of the second support supports at least one auxiliary branch provided with second measuring means, with said auxiliary branches extending in a direction transverse to the direction of extension intended to correspond to the circumferential direction of the annular duct wherein the branches are mounted.

In one embodiment of the invention, with the main branch of the second support being, in said direction of extension, shorter than the main branch of the first support, and the auxiliary branches:

extending on different radiuses, in the circumferential direction transverse to said direction of extension, and being, each, provided with measuring means able to execute pressure and/or temperature measurements at various measuring points spaced apart in said direction of extension and circumferential direction, characterized in that the second support and the first support are coupled together to have only one degree of freedom relative to each other among one circumferential degree of freedom and one transversal degree of freedom relative to said direction of extension and said circumferential direction.

The invention also relates to an assembly comprising an annular duct having a longitudinal axis radially limited outwards by a radially external wall which supports a device as described above.

The annular duct is preferably that of a test turbine engine and delimits the annular flow passage for flowing the secondary air flow.

According to another characteristic of the invention, the radially external annular wall comprises one opening through which the first support and the second support are mounted so that the first support applies onto the second support, with the longitudinal dimension of the first support and the longitudinal dimension of the second support each being smaller than the longitudinal dimension of the opening of the radially external annular wall, with the longitudinal dimension of the first support and the second support in the flow passage being greater than the axial dimension of the opening of the annular wall.

Using a device for measuring the characteristics of an air flow with a first support and a second structurally independent support, enables mounting kinematics from outside the radially external annular wall. Besides, the cumulated longitudinal dimensions of the main branches of the first and second supports may be greater than the longitudinal dimension of the opening. The circumference dimensions of the device support can thus be reduced and the longitudinal dimension thereof can be increased while preserving the mounting from outside the annular duct. The impact of the device, or at least the part thereof which extends into the air annular flow passage, on the air flow is thus less important than in the prior art.

In one embodiment of the invention, the first support and the second support each comprise a baseplate formed at the radially external end of the respective main branch thereof, with such baseplates being mounted in the opening of the external annular wall and attached to said annular wall.

According to still another embodiment of the invention, the baseplates of the first and second supports are attached, for instance by bolting, on a plate integral with an intermediate part inserted between the plate and the annular wall, with said intermediate part being attached to the external annular wall.

The invention also relates to a method for assembling the above-mentioned assembly:

a) introducing the main branch of the first support into the opening of the annular wall through the end thereof opposite the one supporting the baseplate and positioning said baseplate at a first circumferential end of said opening;

b) introducing the main branch of the second support into the opening of the annular wall through the end thereof opposite the one supporting the baseplate, with said base being positioned at a second circumferential end of said opening;

c) moving the first and second supports in the circumferential direction so that the main branches longitudinally apply on one another.

According to the invention, the method comprises a step consisting in removably attaching at least one radial rod to each baseplate, prior to step a), and using such rods to hold the main branches in position from outside the annular wall.

Eventually, the method comprises after step c), the following steps which are executed from outside the annular wall:

mounting the intermediate part so that one central opening thereof encloses the baseplates;

mounting the plate in contact with the baseplates, simultaneously holding the rods with one hand using a suitable tool, inserting threaded rods through the plate and screwing same into the baseplates of the first and second supports.

The dissociation, explained above, into a first support and a second support makes the mounting in the air annular flow passage simpler.

Optimizing the dynamic behaviour of the auxiliary branches may however raise problems. As a matter of fact, the measuring device is dynamically sized. This consists in calculating the frequencies specific to the auxiliary branches, also called rakes, and checking that these are not equal to the frequency associated with the engine reference rotation speed (typically idling speed, cruising speed, maximum speed).

To validate the dynamic behaviour of the devices, the margins between the specific frequency, engine speed and harmonics must meet very precise requirements and be safe, with all solicitations.

When using two independent supports, one difficulty arises in that frequencies are not the same for the first and the second supports. Such frequencies interact with the harmonics of the rotor and aerodynamic unbalances in some operation ranges. Some frequency ranges thus have to be avoided.

Now the fact that the dynamic behaviour of the device, i.e. the first and second supports, has to be adapted to increase the specific frequencies thereof, while meeting the aerodynamic requirements is understandable.

The invention thus also relates to an assembly, which can be a turbine engine, wherein, with the main branch of the second support being, in said flow passage, radially shorter than the main branch of the first support, and the auxiliary branches extending circumferentially, on different radiuses and each being provided with measuring means able to execute pressure and/or temperature measurements at various measuring points radially and circumferentially spaced apart in said flow passage, the second support and the first support are so coupled together as to have only one degree of freedom relative to each other among one circumferential degree of freedom (or an angular one) and one degree of freedom along said axis.

To execute such a coupling without making the assembling in the flow passage more complex, with a simple and reliable mechanics, it is also provided that, for coupling the first and second supports, the second support should comprise a pin having a radially internal free length and the first support comprises one opening receiving the radially internal free length of the pin having, as degree(s) of freedom, at least said only one degree of freedom among one circumferential degree of freedom and one degree of freedom along said axis.

Considering the shape configurations imposed by aerodynamics, the above-mentioned mechanical stresses (control of vibration frequencies) and manufacturing, positioning and maintenance requirements, such pin and opening solution will enable the practical and efficient lay-out, as follows, wherein:

on the second support, the pin will extend substantially coaxially to the radial direction along which the main branch extends, on the radially internal face of a central part of said at least one auxiliary branch, and, on the first support, the opening will be located in a substantially axial rim that the main branch has, where an elbow is, and will open out on said rim.

Besides, such a solution with a pin and an opening provided, respectively, on the first and second supports will make it possible to provide for several types of couplings.

As a matter of fact, requirements relating to pressure and/or temperature measurements in the flow passage may typically impart different immersions of the supports in the flow passage. This is the reason why the measuring device is so provided as to include several types of first and second supports, typically four sets having different sizes, with shorter or longer main branches and possibly having two arches (auxiliary branches) each. Now the dynamic behaviour will be different according to the types of the first and second supports considered.

This is the reason why two types of coupling between the first and second couplings have been defined.

In the first type, the opening will be defined by a groove, which will be:

opened radially outwards so as to receive the pin, and circumferentially elongated so as to provide one said circumferential degree of freedom, between the first and second supports.

In the second type, the opening will be defined by a hole:

wherein the radially internal free length of the pin will be engaged, and which will be axially elongated, so as to provide one said degree of freedom along said axis.

To still limit the risks of negative vibrations, it has also been provided that the first support and the second support are engaged one in the other, where coupled together, with no rigid attachment therebetween, so that only one said degree of freedom exists relative to one another among one circumferential degree of freedom and one degree of freedom along said axis (X).

For this purpose, it may also be provided that, where coupled together, the first support and the second support are in mutual radial abutment, once mounted in the flow passage.

Such solution will further make it possible to provide a suitable engagement of the pin into the opening, if such coupling means are selected.

All, or a part of the above characteristics may be completed by the fact that, outside said flow passage, the first support and the second support are rigidly attached to said annular wall, without any degree of freedom relative to one another.

A common rigid behaviour will then exist at the radially external end of the first and second supports, which will still reinforce the control of vibrations and make the mounting easier.

BRIEF DESCRIPTION OF THE DRAWINGS

The invention will be better understood and other details, characteristics, and advantages of the invention will appear on reading the following description given by way of non-limiting example and with reference to the accompanying drawings, in which.

DETAILED DESCRIPTION OF THE PREFERRED EMBODIMENTS

Figures 3, 4, 5:
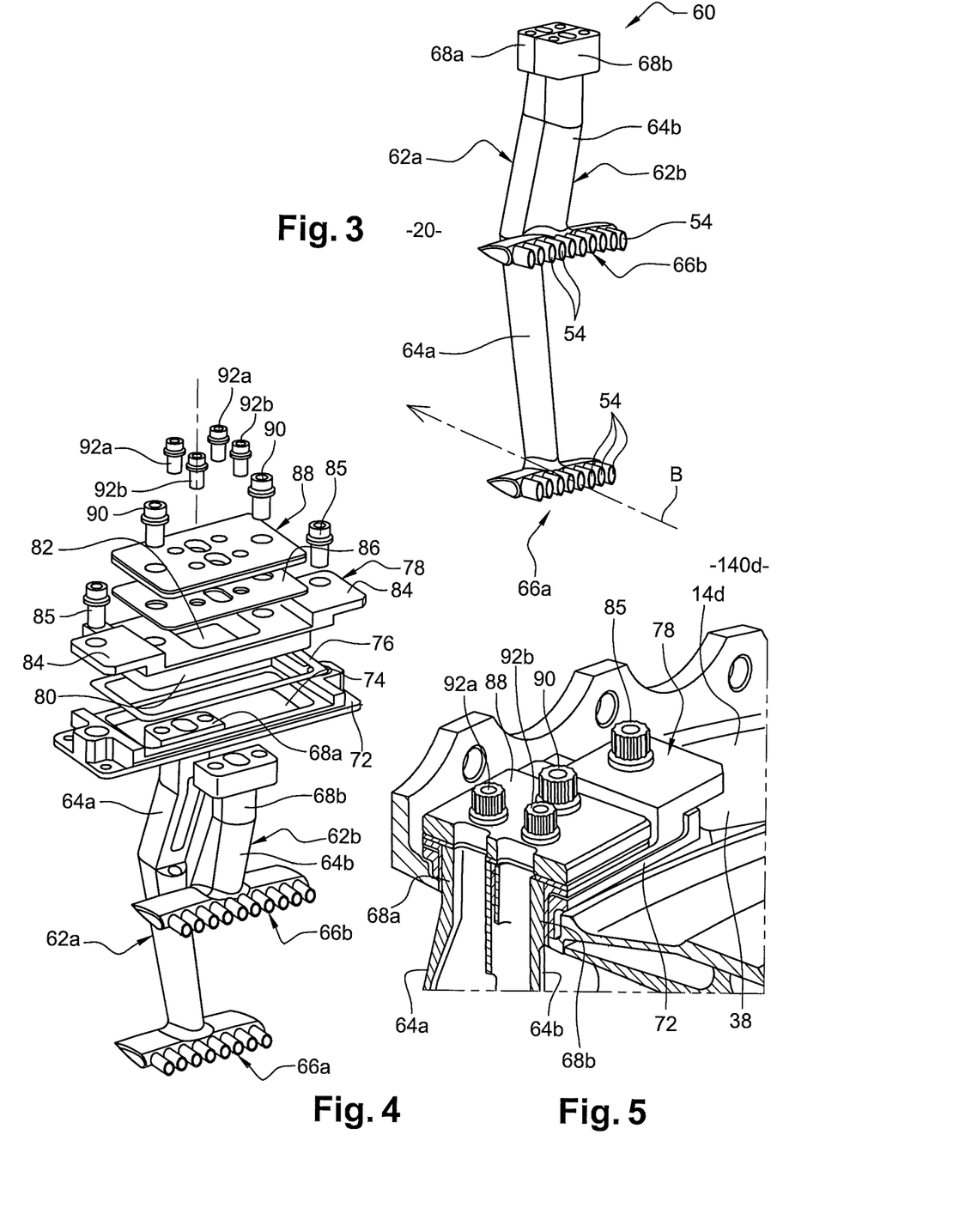
FIG. 3 is a perspective schematic view of one embodiment of the device according to the invention.
FIG. 4 is a perspective and exploded schematic view of the device of FIG. 5 and the elements for attaching the device of FIG. 3 on an external annular wall, externally defining a secondary annular flow passage of a test turbine engine.
FIG. 5 is a perspective schematic view of the attaching of the device of FIG. 3 on an external annular wall, externally defining a secondary annular flow passage of a test turbine engine.

Reference is now made to FIG. 3, which shows a device 60 for measuring the characteristics of an air flow according to the invention, which comprises two supports 62a, 62b, which are structurally independent from each other, i.e. the first support 62a forms a first part which can be removed from the second support 62b which forms a second part. Each first support 62a and second support 62b comprises a main branch 64a, 64b intended to extend substantially radially (axis Z on FIGS. 3 and 4) relative to axis X of the radially external annular wall 38 of the intermediate casing (disclosed in reference to FIG. 1). The flowing axis of the air flow B is shown in dotted lines on FIGS. 3 and 4 and is parallel to axis X. The main branch 64a of the first support 62a extends on a distance greater than the main branch 64b of the second support 62b.

Each main branch 64a, 64b supports, at a first end or radially internal end, an auxiliary branch 66a, 66b which extends in the circumferential direction of the annular air flow passage 20. In practice, each main branch 64a, 64b supports only one auxiliary branch 66a, 66b in order to avoid increasing the overall dimensions of the main branch 64a, 64b which must accommodate the cables or wires for operating the (temperature and/or pressure) sensors mounted in the nozzles 54.

As can be seen in FIG. 3, the main branch 64a of the first support 62a extends on a distance greater than the main branch 64b of the second support 62b, i.e. in the direction of the axis Z or elongation direction. The difference in length between the two main branches 62a, 62b above depends on the radial position, in the annular flow passage 20, along which it is desired to measure characteristics of the air flow.

The auxiliary branches 66a, 66b of the first 62a and second 62b supports extend circumferentially on arcs of circle having different radiuses, with said arcs of circle being centered on the axis X of the annular flow passage 20. The auxiliary branches 66a, 66b are each provided with measuring means able to carry out measurements, such as pressure and/or temperature, at various measuring points circumferentially spaced apart, along the arc of circle associated with an auxiliary branch 66a, 66b. The auxiliary branch 66a of the first support 62a thus comprises first measuring means and the auxiliary branch 66b of the second support 62b comprises second measuring means.

Each main branch 64a, 64b of the first and second supports 62a, 62b supports, at the second end thereof opposite the first end thereof, i.e. at the radially external end thereof, a baseplate 68a, 68b for attachment to the external annular wall 38. The baseplates 68a, 68b are intended to be applied one on the other in the longitudinal direction and mounted in one opening 70 or passage in the radially external annular wall 38.

Figure 6A:
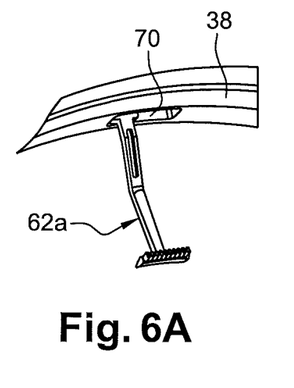
FIGS. 6A, 6B and 6C are perspective schematic views of the sequence of mounting the measuring device through the external annular wall externally defining a secondary annular flow passage of a test turbine engine, as seen from inside the annular flow passage.
Figure 6B:
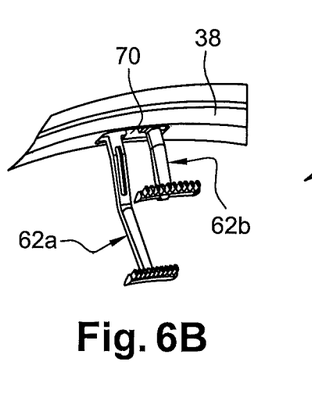
Figure 6C:
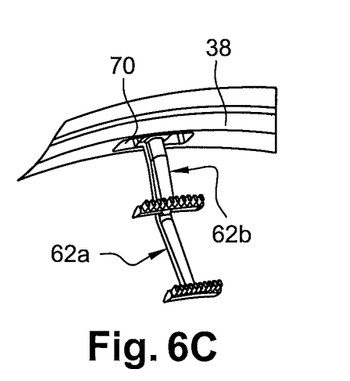
Figure 7A:
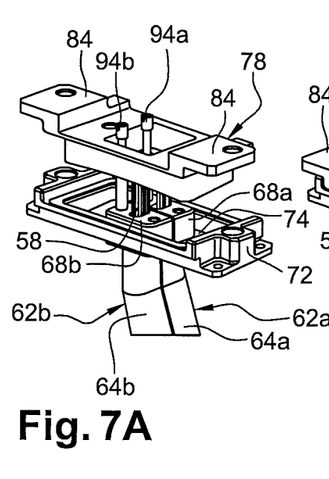
FIGS. 7A, 7B, 7C, 7D and 7E are perspective schematic views of the successive steps of attaching the device according to the invention on an external annular wall externally defining a secondary annular flow passage of a test turbine engine.
Figure 7B:
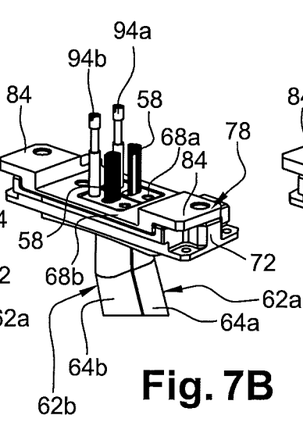
Figure 7C:
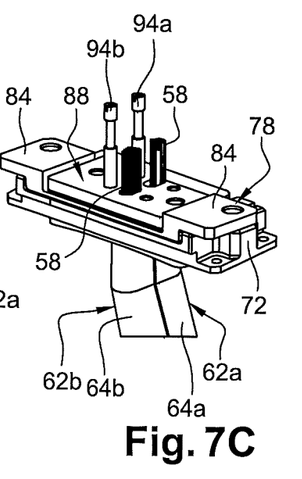
Figure 7D:
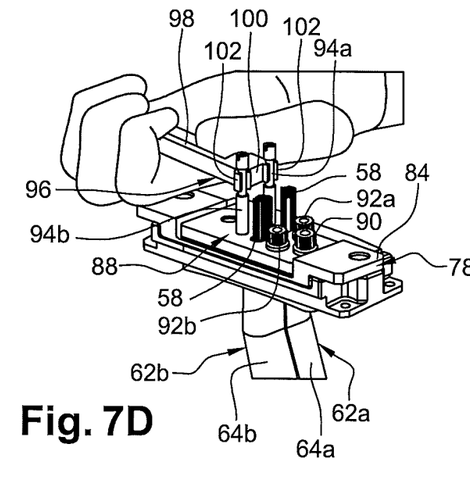
Figure 7E:
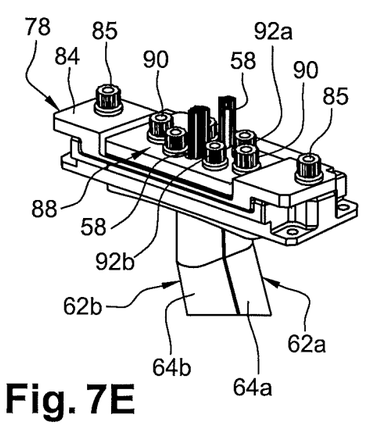

As shown in FIGS. 4 and 5, the device 60 is attached to the radially external annular wall 38 using an assembly of attaching means shown in an exploded view in FIG. 5 and assembled together in FIG. 6. A jointing and supporting frame 72 is mounted on the external periphery of the opening 70 of the external annular wall 38. The opening 70 is best visible in FIGS. 6A, 6B and 6C which will be disclosed later while referring to the mounting kinematics. Such frame 72 comprises one opening 74 specifically intended for the passage of electric wires 58 connecting the first and second measuring means and the processing and analyzing means. The frame 72 forms a support for a stack of successive elements which are a closed outline joint 76 which is applied onto a radially external face of the frame 72, an intermediate part 78 comprising a central portion 80 which engages through the joint 76 and into the opening 74 of the supporting frame 72. Such intermediate part 78 comprises a central opening 82 which communicates with the opening 74 of the support frame 72 for the passage of electric wires 58 mentioned above up to the processing and analyzing means (FIGS. 4 and 7A). The intermediate part 78 also comprises two side fingers 84 which extend circumferentially and in opposite directions, relative to the various orientations of the flow passage 20. The two fingers 84 are attached to the supporting frame 72 and to the radially external annular wall 38 by means of first screws 85. The two fingers 84 define, circumferentially, a recess wherein a sealing gasket 86 and a plate 88 are mounted. The baseplates 68a, 68b of the first and second supports 62a, 62b are engaged into the opening 74 of the supporting frame 72 and into the opening 82 of the intermediary part 78 and are flush with the face defining radially inwards the bottom face of the intermediary part 78. Said baseplates 68a, 68b thus contact the joint 86. Second screws 90 go through the plate 88, the joint 86 from the outside and are screwed into the intermediate part 78, more precisely into the bottom wall of the recess. Third screws 92a, 92b, i.e. two pairs thereof, are engaged, from the outside, through the plate 88, the joint 86 and are screwed into the baseplates 68a, 68b, of the first 62a and second supports. Such mounting thus provides the attachment of the first and second supports 62b onto the radially external annular wall 38.

The mounting of the device according to the invention in the annular flow passage will now be described while referring to FIGS. 6A, 6B and 6C and the attachment sequence will be disclosed while referring to FIGS. 7A to 7E. Prior to mounting, a threaded rod 94a, 94b is screwed into each one of the baseplates 68a, 68b of the first 62a and second 62b supports. Such rods 94a, 94b are long enough to enable handling thereof from outside the radially external annular wall 38 as will be described hereafter.

First, the main branch 64a of the first support 62a is engaged through the opening 70 or passage of the radially external annular wall 38, with the baseplate 68a being positioned at a first circumferential end of the opening 70 of the annular wall 38. Second, the main branch 64b of the second support 62b is engaged into the passage 70, with the baseplate 68b thereof being positioned at the second circumferential end of the passage 70. Both supports 62a, 62b are then positioned circumferentially closer to each other so that the main branches 64a, 64b are longitudinally applied on one another. The first and second supports 62a, 62b are handled using the auxiliary branches 66a, 66b oriented in the circumferential direction.

Upon completion of the mounting, the operator positions the central portion 80 of the intermediary part 78 in the opening 74 of the frame 72, with the frame 72 and the gasket 76 being positioned on the annular wall 38 prior to the insertion of the first 62a and second 62b supports through the opening 70 of the annular part 38. The operator then positions the seal 86 and the plate 88 in the recess of the intermediary part 78, i.e. between the two side fingers 84 of the intermediary part 78.

The operator then uses a suitable tool 96 which enables same to hold both rods 94a, 94b in one hand, so that he/she can position the first 85, second 90 and third 92a, 92b screws. For this purpose, the tool 96 comprises a gripping portion 98 and an attachment portion 100 which comprises two zones 102 for clamping or tightening the rods 94a, 94b by resilient fitting inside same. The space between the two clamping zones 102 is determined to ensure a simultaneous clamping of both rods 94a, 94b by the tool 96.

When the tool 96 is in a position to hold the rods 94a, 94b, the baseplates 68a, 68b radially abut outwards on the seal 86. The operator can thus drive the first 85 and second 90 screws as well as a third screw 92a for fixing the baseplate 68a of the first support 62a et and a third screw 92b for fixing the baseplate 68b of the second support 62b. The threaded rods 94a, 94b can then be unscrewed so that the third remaining screws 92a, 92b can be inserted therein to complete the attaching of the baseplates 68a, 68b of the first 62a and second 62b supports.

Eventually, it shall be noted that using a device comprising two structurally independent supports 62a, 62b makes it possible to size the main branches 64a, 64b of the first 62a and second 62b supports, so that the sum of the respective longitudinal dimension thereof is larger than the longitudinal dimension of the opening 70 of the radially external annular wall. The circumferentially dimension of each one of the main branches 64a, 64b can thus be so reduced as to limit the impact of the measuring device on the air flow.

As can be seen in FIGS. 3, 4 and 7A more particularly, the external surface of the main branch 64a of the first support 62a continuously extends into the external surface of the main branch 64b of the second support 62b, so as to limit the formation of turbulences in the air flow at the junction between the first 62a and second 62b supports.

The measuring device 13d comprises at least one second support 15d and one first support 16d connected together. Each second support 15d and first support 16d comprises a main branch, respectively 18d, 17d which extends globally radially (axis Z FIGS. 8 and 9) relative to the axis X of the annular wall 14d and which supports at least one circumferentially auxiliary branch, respectively 22d, 21d with only one auxiliary branch in the example.

Figures 8, 9, 10, 11:
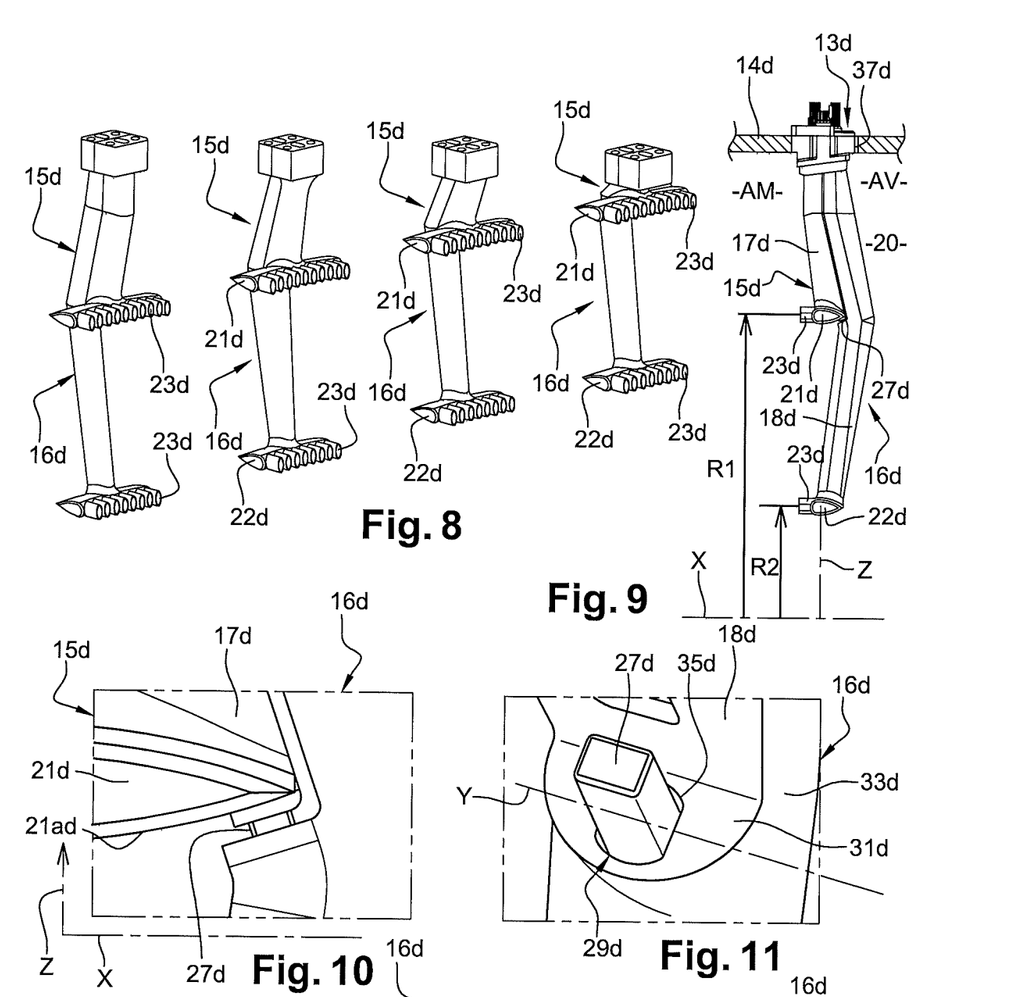
FIG. 8 shows the measuring device in several sizes.
FIG. 9 is a side view of a measuring device.
FIGS. 10 and 11 and then 12 and 13 show two alternative solutions of two details of the expected coupling on the device.

In the flow passage 20, the main branch 17d of the second support 16d is here radially (axis Z) shorter than the main branch 18d of the first support 16d. It may be equal to half such main branch, or longer, or shorter.

Besides the auxiliary branches 21d, 22d supported by the respective main branches 17d,18d extend circumferentially, with different radiuses (R1, R2 FIG. 5, centered on the axis X) and are each provided with measuring means 23d able to execute measurements, such as pressure and/or temperature, at various measuring points radially and circumferentially spaced apart, i.e. in said flow passage 20.

Several types of the device 13d are provided for, with the second supports 15d and first supports 16d thereof which, from the annular wall 14d, radially extend more or less deeply into the flow passage, along the radial axis Z, to make it possible to execute the desired measurements, with the various required radiuses, such as R1, R2 FIG. 9.

In order to adapt the dynamic behaviour of the branches, specifically in order to increase the specific frequencies thereof while meeting the aerodynamic requirements, at least some of such types of device 13d comprise second supports 15d and first supports 16d coupled together to have only one degree of freedom relative to each other among one circumferential degree of freedom and one degree of freedom along said axis (X).

Such coupling by means of a mechanical linkage, thus provided in the secondary flow passage 20, will limit the relative movements between the second support 15d and first support 16d, by increasing the resonance frequency of the device between such supports, with such first and second supports even being preferably mutually engaged where they are coupled together, with no rigid attachment therebetween at such a point, so that they just have said permissible degree of freedom relative to each other.

In addition to said so-called degree of freedom among the circumferential (or angular) and the axial (axis X) one, the second support 15d and the first support 16d are, in the embodiment shown here, rigidly attached, outside said flow passage, to the annular wall 14d by fixture 25d, without any degree of freedom with respect to each other.

The two supports 15d,16d thus extend into the fluid flow passage 20 while hanging from the annular wall 14d by such common fixture 25d.

As mentioned above, using a pin 27d/opening 29d combination for coupling will associate simplicity, reliability and efficiency.

Besides, FIGS. 9-13 show such solution, wherein the second support 15d comprises a pin 27d, typically welded thereto, having a radially internal free length L1 and the first support 16d comprises an opening 29d wherein the free length L1 of the pin which thus has the at least one degree of freedom among the circumferential and the axial ones, is received.

In the preferred embodiment shown, and as can more particularly be seen in FIG. 10, on the second support 15d, the pin 27d extends substantially coaxially with the radial direction Z along which the main branch 17d extends, on the radially internal face 21ad of a central portion of the auxiliary branch 21d on the circumference.

The radially internal face 21ad is, in the preferred embodiment, defined by a profiled shape, tapering in the downstream direction, like a wing. And the pin 27d protrudes from such tapering portion.

Even though the main branch 17d is not strictly rectilinear, but slightly bent in the downstream direction (AV: axis X), it can be considered that the pin 27d extends substantially coaxially to the radial direction Z along which the main branch 17d extends.

In the first support 16, the opening 29d is located in a substantially axial (perpendicular to the pin axis) rim 31d of the main branch 18d, at an elbow 33d of the first support 16d.

It can be noted that, as regards the elbows of the main branches 17d,18d, if said branches have one, close to their entering the flow passage 20 which orientates same slightly in the downward direction (AV; axis X), a second elbow located radially at the coupling 27d-29d slightly orientates the main branch 18d (the longer one) in the upstream direction (AM; axis X), which thus positions the sensors 23d directly above those on the main branch 17d (refer specifically to FIG. 9).

Two alternative embodiments of the openings 29d are provided. These will be applied according to the empirical findings or simulated tests.

In the selected example, it thus could be noted that the device 13d having the longest second and first supports 15d,16d in FIG. 8 (left pair in the Figure) could show a coincidence between a first tangential bending mode and the 2N harmonics (rank 2), in a stabilization range of the tested engine, a modification of geometry parameters such as the thickness of the walls of said supports or the width of the sensors 23d which did not make it possible to significantly increase the frequency.

It has thus been decided to increase the resonance frequency by linking such second and first supports 15d,16d in the circumferential direction (Y in FIG. 7) but allowing a possible, yet limited, substantially axial relative clearance, (in FIGS. 6, 7; axis X).

After validation, it could be noted that such coupling would make it possible to increase the resonance frequency of the first circumferential bending mode by approximately 15-20% and thus to go beyond the range of prohibited frequencies.

As for the device 13d which has the shorter second and first supports 15d,16d (right pair in FIG. 4), it could be noted that it could show a coincidence between a second axial bending mode and the 2N harmonics, again in the operation range of the tested engine.

In order to again avoid critical frequencies, it has been decided to link the second and first supports 15d,16d in the substantially axial direction and allow a possible, yet limited, relative circumferential clearance (in FIGS. 8, 9). This made it possible to obtain that the axial bending mode of the first support 16d (the longest one) became a bending mode of the auxiliary circumferentially branch(es), respectively 22d, 21d.

FIGS. 10-11 show the first case in greater details: circumferential locking, (along Y) and potential substantially axial clearance (in FIGS. 10,11; axis X).

Figure 12:
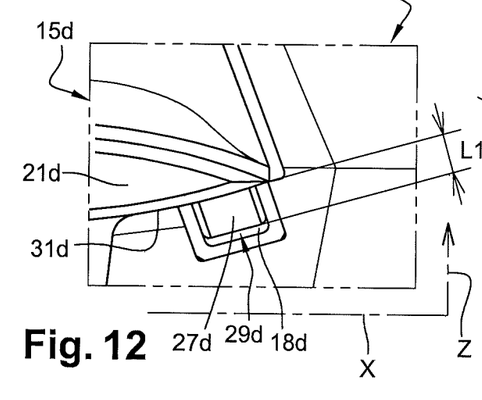
Figure 13:
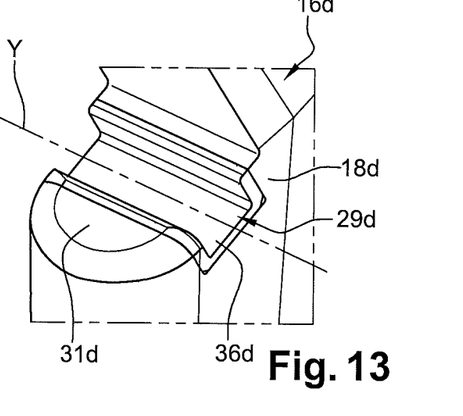

FIGS. 12-13 show the second case in greater details.

In the first case, the opening 29d will be defined by a hole 35d:
  wherein the radially internal free length L1 (refer to FIG. 12) of the pin 27d is engaged, which pin is substantially radially accommodated therein, so as to be circumferentially adjusted, and
  which is axially elongated (for instance rather oblong), to provide said desired axial degree of freedom.

In the second case, the opening 29d will be defined by a groove 36d:
  which is radially externally opened so as to receive the pin 27d again, which is axially adjusted therein, and which is circumferentially elongated (in the Y direction, transversal to X) so as to provide the desired degree of freedom on the circumference.

In either case, it can be provided for the second support 15d and first support 16d not to be in mutual radial abutment, where same are coupled together. The relative degree of freedom thereof will thus be left free. A radially sliding adjustment will then advantageously exist between the two supports.

The rakes architecture has been optimized as much as possible to reduce the obstruction while taking into account the solicitations resulting from the flow, with such optimizing of the maximum section not being sufficient to comply with the aerodynamic requirements. To reach the maximum optimizing of such rakes, the architecture had to be changed so that the engine interface could be kept.

The architecture of measuring devices had already been optimized to reduce the obstruction while taking into account the stresses resulting from the flow. Such optimized maximum section however revealed insufficient to take into account the aerodynamic requirements.

To reach the maximum optimizing of such rakes, changing the architecture was deemed necessary to keep the engine interface, which led to uncouple the rakes.

It should also be noted that coupling the two supports 15d, 16d made it possible to comply with strict dimensional requirements (specifically relating to the size of the flow passages) while reducing the intrusive characteristics of the device. The solution provided made it possible to couple independent specific modes and to obtain assembly modes having high enough specific frequencies. A reduced obstruction and loss of head in the flow passage could be noted.

The resulting mounting kinematics, radially executed from the outside further made it possible to produce a measuring device the dimensions of which should normally have required mounting from the inside, which is generally difficult (as regards integration), or even impossible.

Mounting from the outside made it possible to mount and dismount the first and second supports 15d, 16d during the test runs, with no significant operation in the turbine engine: no engine part (flange, casing, . . . ) to be dismounted to disassemble and re-assemble the device.

For this purpose, the following procedure has been defined, to mount the measuring device 13d in the secondary flow passage 20 and on the annular wall 14d, with the latter being therefor provided with a passage 37d so as to insert such device 13d therein radially from the outside: First, with separate second and first supports 15d,16d, the second support 16d is radially inserted from the external periphery 140d of the wall 14 (FIG. 5), into the flow passage 20 and through the passage 37d of the wall 14d and it is positioned with (said at least one) auxiliary branch 21d being circumferentially oriented. Then, still from outside the flow passage, the second support 15d is inserted into the same passage 37d, circumferentially, next to the first support 16d and it is positioned with (said at least one) auxiliary branch 21d being circumferentially oriented. Then, the second and first supports 15d,16d which protrude outside the passage 37d, are circumferentially moved towards one another, until the second support is positioned in front of the first one, immediately upstream thereof relative to the axial direction X of the gas flow in the flow passage. The second and first supports are then radially moved towards one another until the radially internal free length of the pin 27d is engaged into the opening 29d.

The invention claimed is:

1. An assembly comprising:
a device for measuring the characteristics of an air flow intended to be mounted in an annular duct having a longitudinal axis in a turbine engine, the device comprising supporting means which support means for measuring the characteristics of an air flow, wherein the supporting means comprise at least one first support including a main branch supporting first measuring means and a second support, structurally independent of the first support and including a main branch supporting second measuring means, with the first support and the second support being so formed that the main branch of the first support extends over a distance greater than the main branch of the second support in a common direction of extension of said branches; and
an annular duct having a longitudinal axis radially limited outwards by a radially external annular wall configured to support the device, wherein the radially external annular wall comprises one opening through which the first support and the second support are mounted so that the first support applies onto the second support, with a longitudinal dimension of the first support and a longitudinal dimension of the second support each being smaller than a longitudinal dimension of the opening of the radially external annular wall, with the longitudinal dimension of the first support and the second support in a flow passage being greater than an axial dimension of the opening of the annular wall.

2. The assembly according to claim 1, wherein the main branch of the first support supports at least one auxiliary branch provided with the first measuring means and the main branch of the second support supports at least one auxiliary branch provided with the second measuring means, with said auxiliary branches extending in a direction transverse to the direction of extension intended to correspond to a circumferential direction of the annular duct wherein the branches are mounted.

3. The assembly according to claim 2, wherein the main branch of the second support is, in said direction of extension, shorter than the main branch of the first support, and the at least one auxiliary branch:
extending on different radiuses, in the circumferential direction transverse to said direction of extension, and
being, each, provided with measuring means able to execute pressure and/or temperature measurements at various measuring points spaced apart in said direction of extension and circumferential direction,
wherein the second support and the first support are removably attached together to have only one degree of freedom relative to each other among one circumferential degree of freedom and one transversal degree of freedom relative to said direction of extension and said circumferential direction.

4. The assembly according to claim 2, wherein, with the main branch of the second support being, in said flow passage, radially shorter than the main branch of the first support, and the auxiliary branches extending circumferentially on different radiuses and each being provided with measuring means able to execute pressure and/or temperature measurements at various measuring points radially spaced apart on the circumference in said flow passage, the second support and the first support are so coupled together as to have only one degree of freedom relative to each other among one degree of freedom on the circumference and one degree of freedom along said axis.

5. The assembly according to claim 4, wherein the second support and first support are engaged one in the other where coupled together, with no rigid attachment therebetween, so that only one said degree of freedom exists relative to one another.

6. The assembly according to claim 4, wherein, outside said flow passage, the second support and first support are rigidly attached to said annular wall, without having one degree of freedom relative to one another.

7. The assembly according to claim 4, wherein, for coupling the second support and the first support, the second support comprises a pin having a radially internal free length and the first support comprises one opening receiving the radially internal free length of the pin having, as degree(s) of freedom, at least said only one degree of freedom among one degree of freedom on the circumference and one degree of freedom along said axis.

8. The assembly according to claim 7, wherein, on the second support, the pin extends substantially coaxially to a radial direction along which the main branch extends, on a radially internal face of a central part of said at least one auxiliary branch, and,
  on the first support, the opening is located in a substantially axial rim that the main branch has, where an elbow is.

9. The assembly according to claim 7, wherein the opening is defined by a groove, which is:
  open radially outwards so as to receive the pin, and
  elongated on the circumference so as to provide one said degree of freedom on the circumference, between the second and first supports.

10. The assembly according to claim 7, wherein the opening is defined by a hole:
  wherein the radially internal free length of the pin is engaged, and
  which is axially elongated, so as to provide one said degree of freedom along said axis.

11. The assembly according to claim 1, wherein the first support and the second support each comprise a baseplate formed at a radially external end of the respective main branch thereof, with such baseplates being mounted in the opening of the external annular wall and attached to said annular wall.

12. The assembly according to claim 11, wherein the baseplates of the first and second supports are attached, on a plate integral with an intermediate part inserted between the plate and the annular wall, with said intermediate part being attached to the external annular wall.

13. The assembly according to claim 12, wherein the baseplates of the first and second supports are attached by bolting.

14. A method for assembling the assembly according to claim 11, comprising the steps of:
  a) introducing the main branch of the first support into the opening of the annular wall through the end thereof opposite the one supporting the baseplate and positioning said baseplate at a first circumferential end of said opening;
  b) introducing the main branch of the second support into the opening of the annular wall through the end thereof opposite the one supporting the baseplate, with said baseplate being positioned at a second circumferential end of said opening; and
  c) moving the first and second supports in a circumferential direction so that the main branches longitudinally apply on one another.

15. The method according to claim 14, wherein, for coupling the second support and the first support, the second support comprises a pin having a radially internal free length and the first support comprises one opening receiving the radially internal free length of the pin of the second support, the pin of the second support having, as degree(s) of freedom, at least only one degree of freedom among one degree of freedom on the circumference and one degree of freedom along said axis, and wherein the method comprises a step consisting in removably attaching at least one radial rod to each baseplate, prior to step a), and using such rods to hold the main branches in position from outside the annular wall.

16. The method according to claim 15, comprising, after step c), the following steps which are executed from outside the annular wall:
  mounting an intermediate part so that one central opening thereof encloses the baseplates;
  mounting a plate in contact with the baseplates,
  simultaneously holding the rods with one hand using a suitable tool, and
  inserting threaded rods through the plate and the screwing same into the baseplates of the first and second supports.

17. An assembly comprising:
  a device for measuring the characteristics of an air flow intended to be mounted in an annular duct having a longitudinal axis in a turbine engine, the device comprising supporting means which support means for measuring the characteristics of an air flow, wherein the supporting means comprise at least one first support including a main branch supporting first measuring means and a second support, structurally independent of the first support and including a main branch supporting second measuring means, with the first support and the second support being so formed that the main branch of the first support extends over a distance greater than the main branch of the second support in a common direction of extension of said branches; and wherein the main branch of the first support supports at least one auxiliary branch provided with the first measuring means and the main branch of the second support supports at least one auxiliary branch provided with the second measuring means, with said auxiliary branches extending in a direction transverse to the direction of extension intended to correspond to a circumferential direction of the annular duct wherein the branches are mounted,
  the assembly further comprising an external annular duct having a longitudinal axis radially limited outwards by a radially external wall configured to support the device,
  wherein, with the main branch of the second support being, in a flow passage, radially shorter than the main branch of the first support, and the auxiliary branches extending circumferentially on different radiuses and each being provided with measuring means able to execute pressure and/or temperature measurements at various measuring points radially spaced apart on a circumference in said flow passage, the second support and the first support are so coupled together as to have only one degree of freedom relative to each other among one degree of freedom on the circumference and one degree of freedom along said axis.

* * * * *